(12) United States Patent
Dai et al.

(10) Patent No.: US 8,836,254 B2
(45) Date of Patent: Sep. 16, 2014

(54) CONTROL OF AN ELECTRICAL MACHINE

(75) Inventors: Hanping Dai, Malmesbury (GB); Yu Chen, Malmesbury (GB); Tuncay Celik, Malmesbury (GB); Libo Zheng, Malmesbury (GB); Yongji Zhou, Malmesbury (GB)

(73) Assignee: Dyson Technology Limited, Malmesbury (GB)

( * ) Notice: Subject to any disclaimer, the term of this patent is extended or adjusted under 35 U.S.C. 154(b) by 268 days.

(21) Appl. No.: 13/252,773

(22) Filed: Oct. 4, 2011

(65) Prior Publication Data

US 2012/0081046 A1    Apr. 5, 2012

(30) Foreign Application Priority Data

Oct. 5, 2010    (GB) ................................... 1016739.3
Oct. 14, 2010   (GB) ................................... 1017376.3

(51) Int. Cl.
| H02P 6/16 | (2006.01) |
| H02P 6/14 | (2006.01) |
| H02P 6/00 | (2006.01) |
| H02P 25/02 | (2006.01) |
| H02P 25/04 | (2006.01) |

(52) U.S. Cl.
CPC .............. *H02P 6/002* (2013.01); *H02P 6/142* (2013.01); *H02P 6/008* (2013.01); *H02P 25/023* (2013.01); *H02P 6/147* (2013.01); *H02P 25/04* (2013.01); *H02P 6/16* (2013.01)
USPC .................. 318/400.04; 318/400.01; 318/700

(58) Field of Classification Search
CPC ....................................................... H02P 6/06
USPC .................................. 318/400.04, 400.01, 700
See application file for complete search history.

(56) References Cited

U.S. PATENT DOCUMENTS 4,514,667 A     4/1985   Sakmann et al.
4,922,169 A *   5/1990   Freeman ..................... 318/400.1

(Continued)

FOREIGN PATENT DOCUMENTS

EP    1 271 760    1/2003
GB    2469130      10/2010

(Continued)

OTHER PUBLICATIONS

International Search Report and Written Opinion mailed Dec. 21, 2012, directed to International Application No. PCT/GB2011/051783; 8 pages.

(Continued)

*Primary Examiner* — David Luo
(74) *Attorney, Agent, or Firm* — Morrison & Foerster LLP

(57) ABSTRACT

A method of controlling an electrical machine that includes selecting an edge of a rotor-position signal as a reference edge and commutating a phase winding of the electrical machine at times relative to the reference edge. The rotor-position signal has at least four edges per mechanical cycle, each of the edges being associated with a respective zero-crossing in back EMF or minimum in inductance of the phase winding. The angular position of at least one of the edges relative to its respective zero-crossing or minimum is different to that of the other edges. The reference edge is then selected from the edges such that the angular position of the reference edge relative to its respective zero-crossing or minimum is the same with each power on of the electrical machine. Additionally, a controller and control system that implement the method.

17 Claims, 7 Drawing Sheets

(56) References Cited

U.S. PATENT DOCUMENTS

| | | | |
|---|---|---|---|
| 5,563,980 | A | 10/1996 | Chen et al. |
| 6,081,087 | A | 6/2000 | Iijima et al. |
| 6,826,499 | B2 * | 11/2004 | Colosky et al. ............ 702/85 |
| 7,023,173 | B2 | 4/2006 | Kim |
| 7,235,941 | B2 * | 6/2007 | Park et al. ............ 318/400.01 |
| 7,250,733 | B2 | 7/2007 | De Filippis et al. |
| 8,373,371 | B2 | 2/2013 | Clothier et al. |
| 8,395,340 | B2 | 3/2013 | Marvelly |
| 2003/0164692 | A1 | 9/2003 | Grand et al. |
| 2004/0155613 | A1 | 8/2004 | Sugiyama et al. |
| 2007/0189739 | A1 | 8/2007 | Dufner et al. |
| 2009/0001912 | A1 | 1/2009 | Miyajima et al. |
| 2010/0117573 | A1 | 5/2010 | Cheng |
| 2012/0081050 | A1 | 4/2012 | Dai |

FOREIGN PATENT DOCUMENTS

| | | |
|---|---|---|
| JP | 7-87778 | 3/1995 |
| JP | 7-135793 | 5/1995 |
| JP | 10-155299 | 6/1998 |
| JP | 11-289788 | 10/1999 |
| JP | 2005-137141 | 5/2005 |

OTHER PUBLICATIONS

GB Search Report mailed Feb. 25, 2011, directed to GB Application No. 1017376.3 (1 page).

GB Search Report mailed Mar. 1, 2011, directed to GB Application No. 1016739.3; 2 pages.

* cited by examiner

| Control signals | | | Power switches | | | | Inverter Condition |
|---|---|---|---|---|---|---|---|
| DIR1 | DIR2 | FW# | Q1 | Q2 | Q3 | Q4 | |
| 0 | 0 | X | 0 | 0 | 0 | 0 | Off |
| 1 | 0 | 1 | 1 | 0 | 0 | 1 | Drive Left-to-Right |
| 0 | 1 | 1 | 0 | 1 | 1 | 0 | Drive Right-to-Left |
| 1 | 0 | 0 | 0 | 0 | 0 | 1 | Freewheel Left-to-Right |
| 0 | 1 | 0 | 0 | 0 | 1 | 0 | Freewheel Right-to-Left |
| 1 | 1 | X | - | - | - | - | Illegal |

CONTROL OF AN ELECTRICAL MACHINE

REFERENCE TO RELATED APPLICATIONS

This application claims the priorities of United Kingdom Application No. 1016739.3, filed Oct. 5, 2010, and United Kingdom Application No. 1017376.3, filed Oct. 14, 2010, the entire contents of which are incorporated herein by reference.

FIELD OF THE INVENTION

The present invention relates to control of an electrical machine.

BACKGROUND OF THE INVENTION

The performance of an electrical machine depends on accurate timing of phase excitation with rotor position. The electrical machine may include a sensor that outputs a signal indicative of the rotor position. Phase excitation then occurs at times relative to edges of the signal. Tolerances within the electrical machine may mean that the duty cycle of the signal is not perfectly balanced. As a result, the performance of the electrical machine may be inconsistent with each power on.

SUMMARY OF THE INVENTION

In a first aspect, the present invention provides a method of controlling an electrical machine, the method comprising selecting an edge of a rotor-position signal as a reference edge, and commutating a phase winding of the electrical machine at times relative to the reference edge, wherein the rotor-position signal has N edges per mechanical cycle, N is at least four, each of the N edges is associated with a respective zero-crossing in back EMF or minimum in inductance of the phase winding, at least one of the N edges has an angular position relative to its respective zero-crossing or minimum that differs from that of the other N edges, and the reference edge is selected from the N edges such that the angular position of the reference edge relative to its respective zero-crossing or minimum is the same with each power on of the electrical machine.

By selecting a reference edge for which the angular position of the edge relative to its respective zero-crossing in back EMF or minimum in inductance is the same, and then exciting the phase winding at times relative to the reference edge, the behaviour of the electrical machine is consistent with each power on irrespective of any duty-cycle imbalance in the rotor-position signal. The power and/or efficiency of the electrical machine are therefore unchanged with each power on. Additionally, if the electrical machine is powered by an AC power supply, the magnitudes of harmonics within the current waveform drawn from the AC power supply are unchanged.

Of the N edges per mechanical cycle, a different edge may be selected as the reference edge with each power on. Nevertheless, the angular position of the reference edge relative to the zero-crossing in back EMF or minimum in inductance is the same.

Selecting the reference edge may comprise measuring a first period between edges n and n+N/2, measuring a second period between edges n+N/2 and n+N, and comparing a first operand and a second operand, wherein the first operand comprises the first period and the second operand comprises the second period. An edge of the first period is then selected in the event that the result of the comparison is logically true, and an edge of the second period is selected in the event that the result of the comparison is logically false. The first period therefore spans roughly one half of a mechanical cycle and the second period spans roughly the other half of the mechanical cycle. By comparing operands that each includes one of these periods, a reference edge may be selected by means of a single compare operation. The steps or instructions necessary to implement the method are therefore relatively simple and thus a relatively cheap microprocessor or the like may be employed.

The first operand may comprise only the first period and the second operand may comprise only the second period. As a result, the reference edge may be determined relatively quickly and simply.

If the speed of the electrical machine varies while measuring the first and second periods, it is possible that the wrong edge may be selected. Selecting the reference edge may therefore comprise measuring a third period between edges n+mN and n+mN+N/2, and measuring a fourth period between edged n+mN-N/2 and n+mN. The first operand then comprises the sum of the first period and the third period, and the second operand comprises the sum of the second period and the fourth period. As a result, the comparison of the two operands takes into account changes in the speed of the electrical machine. In particular, the same reference edge is selected when the speed of the electrical machine is constant or varies linearly.

The value of m may equal one. As a result, the second and fourth periods are one and the same. This then reduces the required number of measurements. In particular, the second and fourth periods are obtained by making a single measurement between edges n+N/2 and n+N.

Selecting the reference edge may comprise suspending excitation of the phase winding. Consequently, the speed of the electrical machine decreases linearly for the time during which the periods are measured.

Selecting an edge of a period may comprise selecting one of a leading edge and a trailing edge of the period.

The rotor-position signal may have N pulses per mechanical cycle, each pulse being defined by two successive edges of the rotor-position signal. Selecting the reference edge may then comprise comparing the lengths of at least two pulses and selecting an edge of the pulse having the longest or shortest length. By comparing the lengths of two or more pulses of the signal, a unique pulse can be identified. The same reference edge can then be selected with each power on by selecting an edge of the unique pulse.

Selecting the reference edge may comprise comparing the lengths of all pulses spanning a mechanical cycle. Alternatively, selecting the reference edge may comprise comparing the lengths of only those pulses having one of a rising leading edge and falling leading edge, and then selecting an edge of the pulse having the longest or shortest length. This then reduces the number of compare operations. If two or more of the pulses have the longest or shortest length (i.e. if there is no single pulse that is longer or shorter than the other pulses) then selecting the reference edge may further comprise comparing the lengths of the other pulses having the other of a rising leading edge and a falling leading edge, and selecting an edge of the other pulse having the longest or shortest length. As a result, the number of compare operations continues to be smaller than that when comparing the lengths of all pulses. If, again, two or more of the other pulses have the longest or shortest length (i.e. if there is no single pulse that is longer or shorter than the other pulses), selecting the reference edge may comprise selecting one of a rising edge and a falling edge of the signal. For a signal having four pulses per mechanical cycle, if the pulses having rising leading edges have the same length and the pulses having falling leading edges have the same length then this implies that the duty cycle of the signal repeats with each mechanical half-cycle. Accordingly, any rising edge or falling edge may be selected, so long as the same type of edge is selected with each power on.

In a second aspect, the present invention provides a method of controlling an electrical machine, the method comprising selecting an edge of a rotor-position signal as a reference edge, and commutating a phase winding of the electrical machine at times relative to the reference edge, wherein the rotor-position signal has N edges per mechanical cycle, N is at least four, and selecting the reference edge comprises: measuring a first period between edges n and n+N/2; measuring a second period between edges n+N/2 and n+N; comparing a first operand and a second operand, wherein the first operand comprises the first period and the second operand comprises the second period; selecting an edge of the first period in the event that the result of the comparison is logically true; and selecting an edge of the second period in the event that the result of the comparison is logically false.

In a third aspect, the present invention provides a control system for an electrical machine, the control system performing the method described in any one of the preceding paragraphs.

In a fourth aspect, the present invention provides a controller for an electrical machine, the controller having an input for receiving a rotor-position signal and one or more outputs for outputting one or more control signals for commutating a phase winding of the electrical machine, the controller selecting an edge of the rotor-position signal as a reference edge and generating control signals for commutating the phase winding at times relative to the reference edge, wherein the rotor-position signal has N edges per mechanical cycle, N is at least four, each of the N edges is associated with a respective zero-crossing in back EMF or minimum in inductance of the phase winding, at least one of the N edges has an angular position relative to its respective zero-crossing or minimum that differs from that of the other N edges, and the reference edge is selected from the N edges such that the angular position of the reference edge relative to its respective zero-crossing or minimum is the same with each power on.

In a fifth aspect, the present invention provides a controller for an electrical machine, the controller having an input for receiving a rotor-position signal and one or more outputs for outputting one or more control signals for commutating a phase winding of the electrical machine, the controller selecting an edge of the rotor-position signal as a reference edge and generating control signals for commutating the phase winding at times relative to the reference edge, wherein the rotor-position signal has N edges per mechanical cycle, N is at least four, and selecting the reference edge comprises: measuring a first period between edges n and n+N/2; measuring a second period between edges n+N/2 and n+N; comparing a first operand and a second operand, wherein the first operand comprises the first period and the second operand comprises the second period; selecting an edge of the first period in the event that the result of the comparison is logically true; and selecting an edge of the second period in the event that the result of the comparison is logically false.

BRIEF DESCRIPTION OF THE DRAWINGS

In order that the present invention may be more readily understood, an embodiment of the invention will now be described, by way of example, with reference to the accompanying drawings, in which.

DETAILED DESCRIPTION OF THE INVENTION

Figure 1:
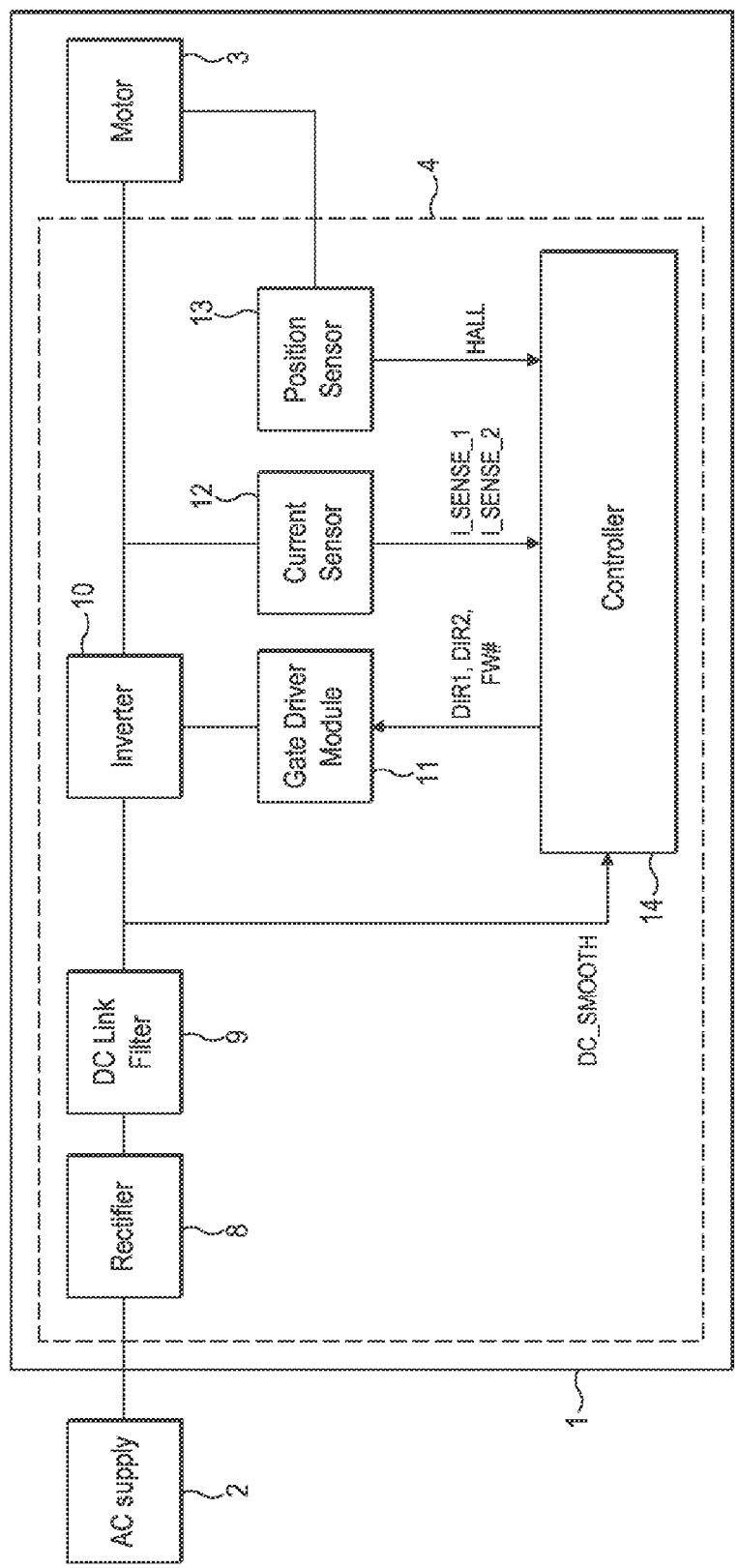
FIG. 1 is a block diagram of a motor system in accordance with the present invention.
Figure 2:
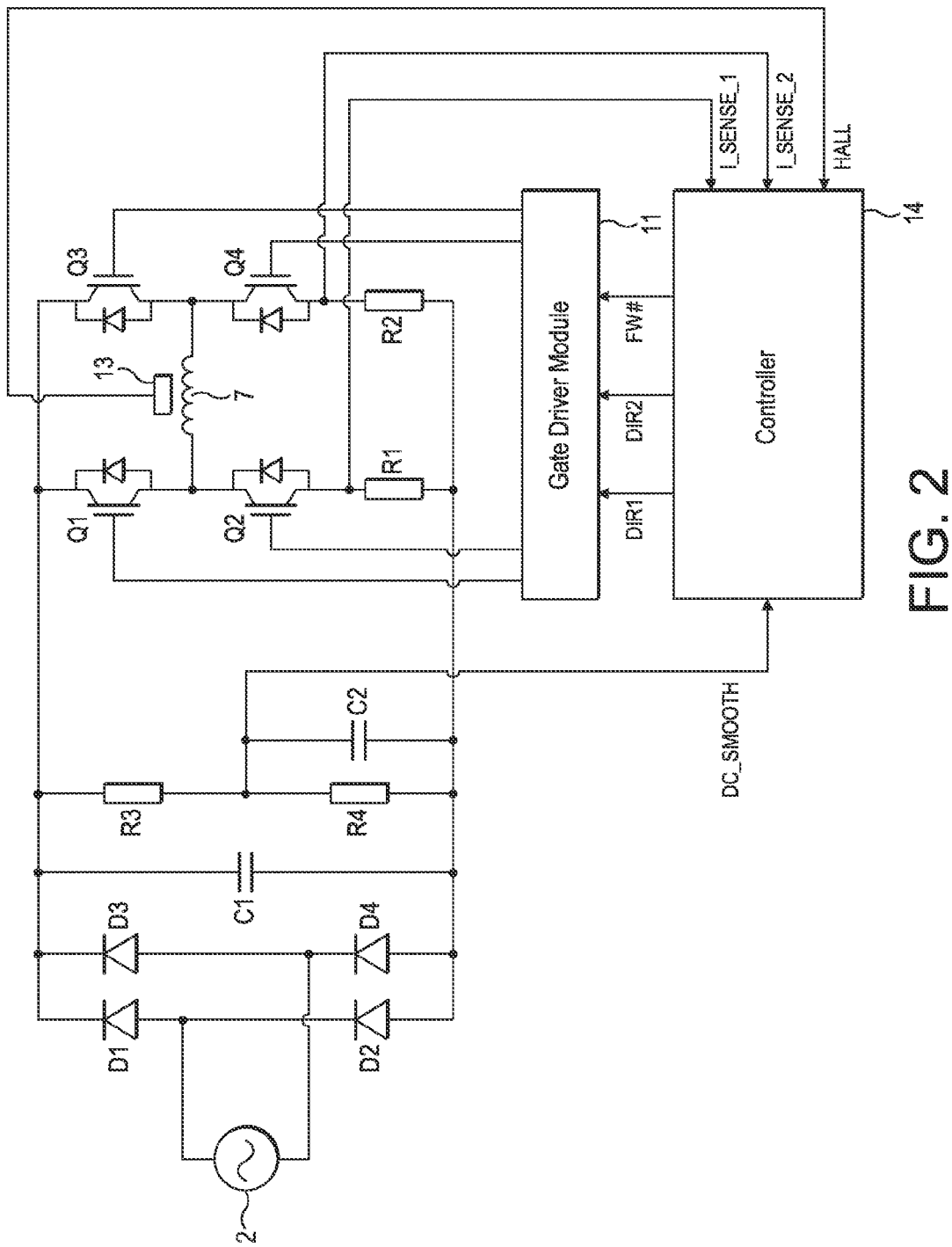
FIG. 2 is a schematic diagram of the motor system.
Figures 3, 4:
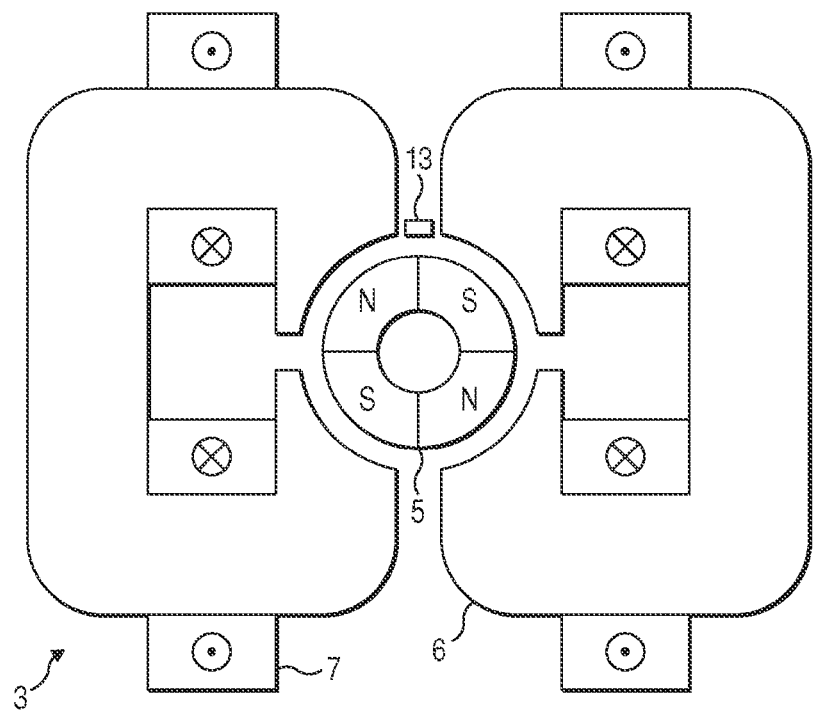
FIG. 3 is a sectional view of the motor of the motor system.
FIG. 4 details the allowed states of the inverter in response to control signals issued by the controller of the motor system.

The motor system 1 of FIGS. 1 to 3 is powered by an AC power supply 2 and comprises a brushless motor 3 and a control system 4.

The motor 3 comprises a four-pole permanent-magnet rotor 5 that rotates relative to a stator 6. The stator 6 comprises a pair of c-shaped cores that define four stator poles. Conductive wires are wound about the cores and are coupled together to form a single phase winding 7.

The control system 4 comprises a rectifier 8, a DC link filter 9, an inverter 10, a gate driver module 11, a current sensor 12, a rotor-position sensor 13, and a controller 14.

The rectifier 8 comprises a full-wave bridge of four diodes D1-D4 that rectify the output of the AC power supply 2 to provide a DC voltage.

The DC link filter 9 comprises a capacitor C1 that smoothes the relatively high-frequency ripple that arises from switching of the inverter 10. If required, the DC link filter 9 may additionally smooth the rectified DC voltage at the fundamental frequency.

The inverter 10 comprises a full bridge of four power switches Q1-Q4 that couple the DC link voltage to the phase winding 7. Each of the switches Q1-Q4 includes a freewheel diode.

The gate driver module 11 drives the opening and closing of the switches Q1-Q4 in response to control signals received from the controller 14.

The current sensor 12 comprises a pair of shunt resistors R1,R2, each resistor located on a lower arm of the inverter 10. The voltage across each resistor R1,R2 is output to the controller 14 as a current sense signal, I_SENSE_1 and I_SENSE_2. The first current sense signal, I_SENSE_1, provides a measure of the current in the phase winding 7 when the inverter 10 is driven from right to left (as is described below in more detail). The second current sense signal, I_SENSE_2, provides a measure of the current in the phase winding 7 when the inverter 10 is driven from left to right. In locating the resistors R1,R2 on the lower arms of the inverter 10, current in the phase winding 7 continues to be sensed during freewheeling (again, as is described below in more detail).

The rotor-position sensor 13 comprises a Hall-effect sensor that outputs a digital signal, HALL, that is logically high or low depending on the direction of magnetic flux through the sensor 13. By locating the sensor 13 adjacent the rotor 5, the HALL signal provides a measure of the angular position of the rotor 5. More particularly, each edge of the HALL signal indicates a change in the polarity of the rotor 5. When rotating, the permanent-magnet rotor 5 induces a back EMF in the phase winding 7. Consequently, each edge of the HALL signal additionally represents a change in the polarity of the back EMF in the phase winding 7.

The controller 14 is responsible for controlling the operation of the motor system 1. In response to four input signals: I_SENSE_1, I_SENSE_2, HALL, and DC_SMOOTH, the controller 14 generates and outputs three control signals: DIR1, DIR2, and FW#. The control signals are output to the gate driver module 11, which in response drives the opening and closing of the switches Q1-Q4 of the inverter 10.

I_SENSE_1 and I_SENSE_2 are the signals output by the current sensor 12, and HALL is the signal output by the rotor-position sensor 13. DC_SMOOTH is a smoothed measure of the DC link voltage, obtained by a potential divider R3,R4 and smoothing capacitor C2.

DIR1 and DIR2 control the direction of current through the inverter 10 and thus through the phase winding 7. When DIR1 is pulled logically high and DIR2 is pulled logically low, the gate driver module 11 closes switches Q1 and Q4, and opens switches Q2 and Q3, thus causing current to be driven through the phase winding 7 from left to right. Conversely, when DIR2 is pulled logically high and DIR1 is pulled logically low, the gate driver module 11 closes switches Q2 and Q3, and opens switches Q1 and Q4, thus causing current to be driven through the phase winding 7 from right to left. Current in the phase winding 7 is therefore commutated by reversing DIR1 and DIR2. If both DIR1 and DIR2 are pulled logically low, the gate drive module 11 opens all switches Q1-Q4.

FW# is used to disconnect the phase winding 7 from the DC link voltage and allow current in the phase winding 7 to freewheel around the low-side loop of the inverter 10. Accordingly, in response to a FW# signal that is pulled logically low, the gate driver module 11 causes both high-side switches Q1,Q2 to open. Current then freewheels around the low-side loop of the inverter 10 in a direction defined by DIR1 and DIR2.

FIG. 4 summarizes the allowed states of the switches Q1-Q4 in response to the control signals of the controller 14. Hereafter, the terms 'set' and 'clear' will be used to indicate that a signal has been pulled logically high and low respectively.

The controller 14 operates in one of two modes depending on the speed of the rotor 5. At speeds below a predetermined speed threshold, the controller 14 operates in acceleration mode. At speeds at or above the speed threshold, the controller 14 operates in steady-state mode. The speed of the rotor 5 is determined from the period, T_PD, between two successive edges of the HALL signal. This period corresponds to the length of one HALL pulse and will hereafter be referred to as the HALL period. T_PD(i) then corresponds to the HALL period between HALL edges i and i+1.

Acceleration Mode

At speeds below the speed threshold, the controller 14 commutates the phase winding 7 in synchrony with the edges of the HALL signal. Each HALL edge represents a change in the polarity of back EMF in the phase winding 7. Consequently, the controller 14 commutates the phase winding 7 in synchrony with the zero-crossings of back EMF.

Commutation involves reversing DIR1 and DIR2 (i.e. clearing DIR1 and setting DIR2, or clearing DIR2 and setting DIR1) so as to reverse the direction of current through the phase winding 7. The phase winding 7 may be freewheeling at the point of commutation. Accordingly, in addition to reversing DIR1 and DIR2, the controller 14 sets FW# so as to ensure that the inverter 10 is returned to a drive condition.

The controller 14 monitors the two current sense signals, I_SENSE_1 and I_SENSE_2. When current in the phase winding 7 exceeds an overcurrent threshold, the controller 14 freewheels the motor 3 by clearing FW#. Freewheeling continues for a freewheel period, T_FW, during which time current in the phase winding 7 is expected to decay to a level below the overcurrent threshold. If current in the phase winding 7 continues to exceed the overcurrent threshold, the controller 14 again freewheels the phase winding 7 for the freewheel period, T_FW. Otherwise, the controller 14 excites the phase winding 7 by setting FW#. Consequently, the controller 14 sequentially excites and freewheels the phase winding 7 over each electrical half-cycle.

Figure 5:
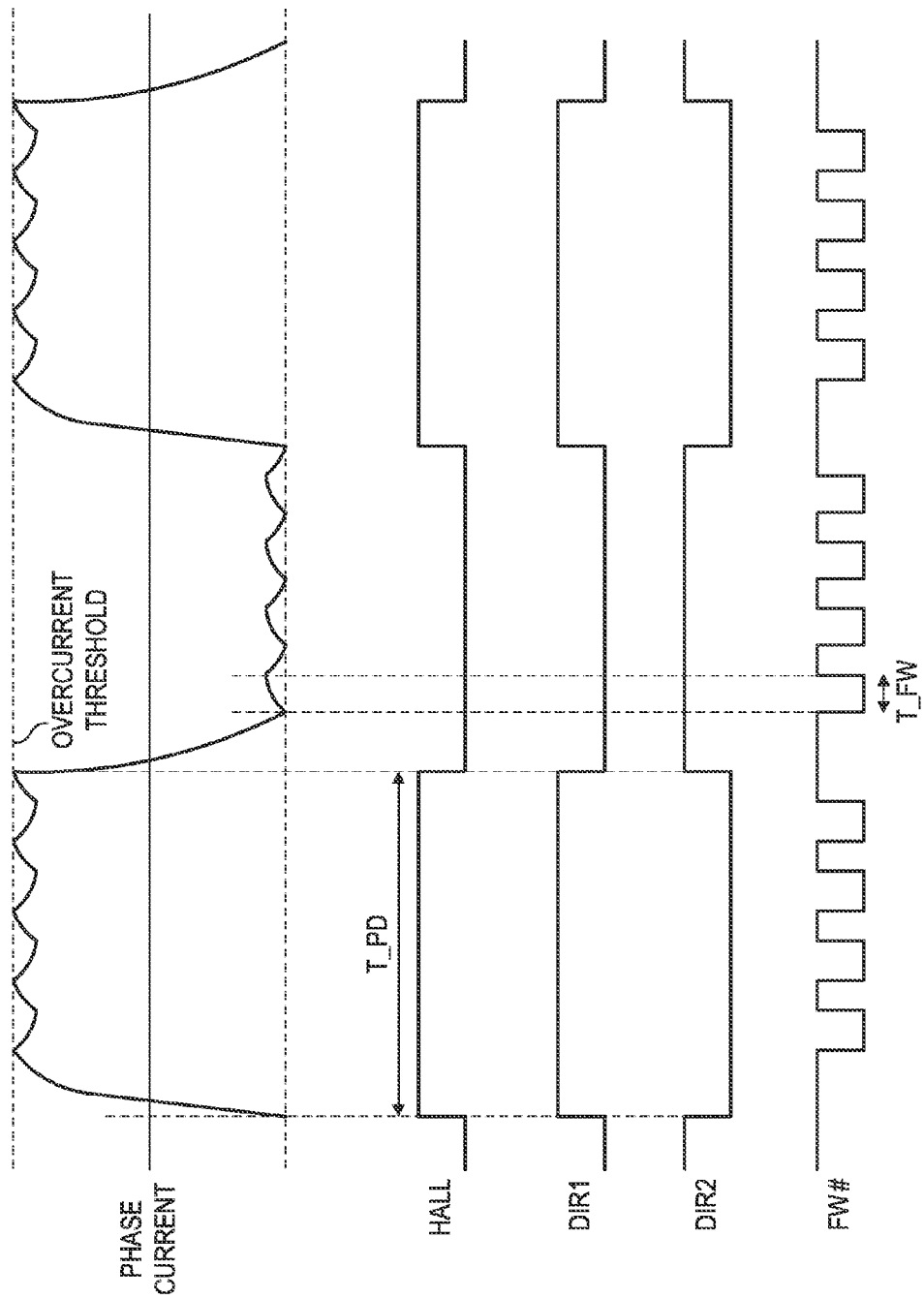
FIG. 5 illustrates various waveforms of the motor system when operating in acceleration mode.

FIG. 5 illustrates the waveforms of the HALL signal, the control signals, and the phase current over a few HALL periods when operating in acceleration mode.

The controller 14 may employ a fixed freewheel period, T_FW. However, for a fixed freewheel period, the corresponding electrical angle increases with rotor speed. Consequently, the remaining electrical angle over which current and thus power is driven into the phase winding 7 decreases. Additionally, as the rotor speed increases, the back EMF induced in the phase winding 7 increases. As a result, phase current decays at a faster rate during freewheeling. Accordingly, rather than employing a fixed freewheel period, the controller 14 instead employs a freewheel period that varies with rotor speed. More particularly, the controller 14 employs a freewheel period that decreases with increasing rotor speed. The controller 14 therefore comprises a freewheel lookup table that stores a freewheel period, T_FW, for each of a plurality of rotor speeds. The controller 14 then periodically updates the freewheel period by indexing the freewheel lookup table using the present rotor speed, as determined from T_PD.

Steady-State Mode

At speeds at or above the speed threshold, the controller 14 commutates the phase winding 7 in advance of each HALL edge, and thus in advance of zero-crossings of back EMF. Again, commutation involves reversing DIR1 and DIR2 and setting FW#.

The controller 14 commutates the phase winding 7 in advance of each HALL edge by an advance period, T_ADV. In order to commutate the phase winding 7 in advance of a particular HALL edge, the controller 14 acts in response to the preceding HALL edge. In response to the preceding HALL edge, n, the controller 14 calculates a commutation period, T_COM(n). The controller 14 then commutates the phase winding 7 at a time, T_COM(n), after the preceding HALL edge. As a result, the controller 14 commutates the phase winding 7 in advance of the subsequent HALL edge, n+1. The way in which the controller 14 calculates the commutation period, T_COM(n), is described below.

As in acceleration mode, the controller 14 freewheels the phase winding 7 whenever current in the phase winding 7 exceeds an overcurrent threshold. Freewheeling continues for the freewheel period, T_FW, during which time current in the phase winding 7 is expected to decay to a level below the overcurrent threshold. If current in the phase winding 7 continues to exceed the overcurrent threshold, the controller 14 again freewheels the phase winding 7. Otherwise, the controller 14 excites the phase winding 7. Consequently, as in acceleration mode, the controller 14 sequentially excites and freewheels the phase winding 7.

When operating in acceleration mode, the controller 14 sequentially excites and freewheels the phase winding 7 over the full length of each electrical half-cycle. In contrast, when operating in steady-state mode, the controller 14 sequentially excites and freewheels the phase winding 7 over a conduction period, T_CD, that typically spans only part of each electrical half-cycle. At the end of the conduction period, the controller 14 freewheels the winding by clearing FW#. Freewheeling then continues indefinitely until such time as the controller 14 commutates the motor 3.

Figure 6:
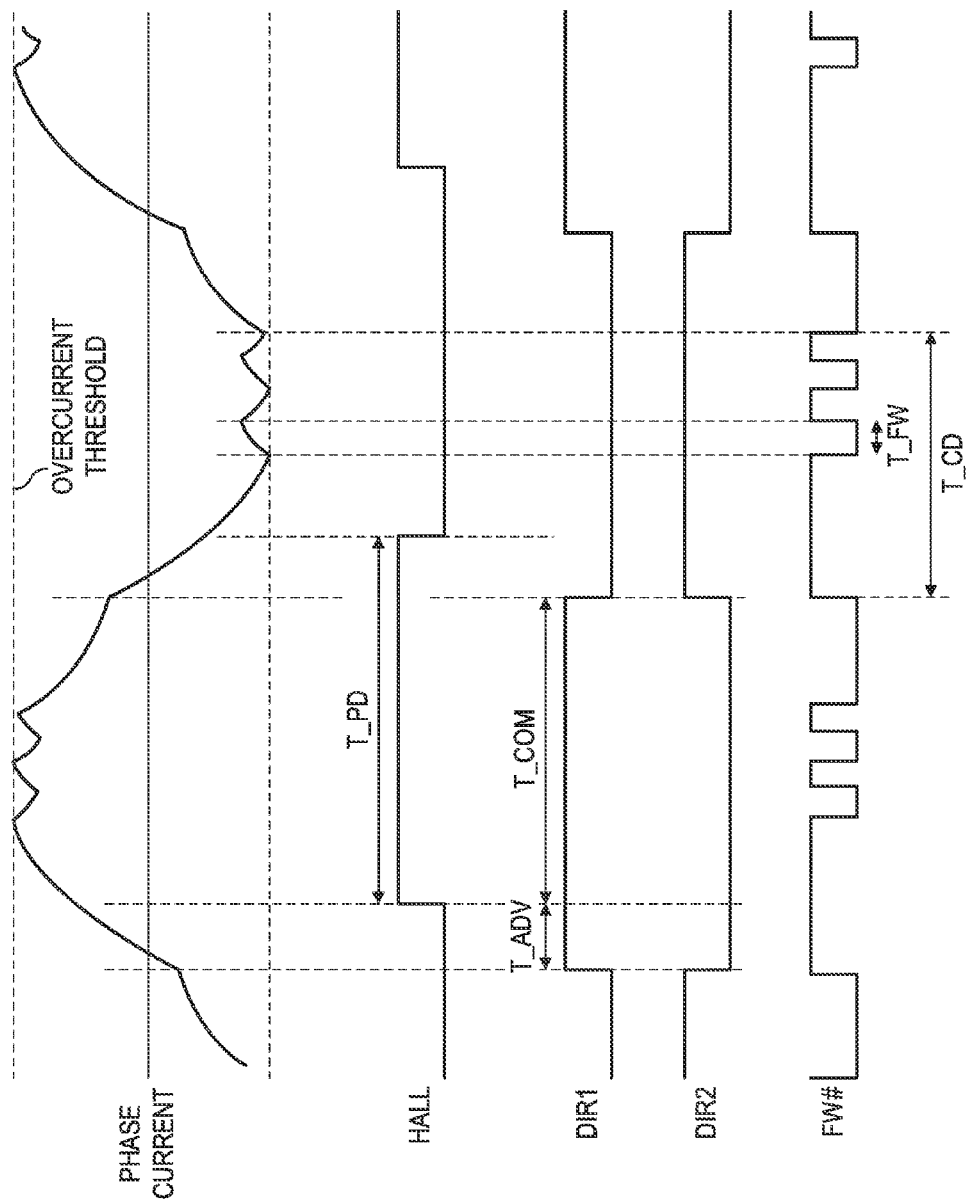
FIG. 6 illustrates various waveforms of the motor system when operating in steady-state mode.

FIG. 6 illustrates the waveforms of the HALL signal, the control signals, and the phase current over a few Hall periods when operating in steady-state mode.

The controller 14 adjusts the advance period, T_ADV and the conduction period, T_CD, in response to changes in the voltage of the power supply 2 (as determined from DC_SMOOTH) and the speed of the rotor 5 (as determined from T_PD). The controller 14 therefore stores an advance lookup table and a conduction lookup table. The advance lookup table stores an advance period, T_ADV, for each of a plurality of supply voltages and rotor speeds. Likewise, the conduction lookup table stores a conduction period, T_CD, for each of a plurality of supply voltage and rotor speeds.

The controller 14 periodically updates the advance period, the conduction period and the freewheel period in response to changes in the supply voltage (as determined from DC_SMOOTH) and/or the rotor speed (as determined from T_PD). For example, the controller 14 may update the various control parameters in response to each or every nth HALL edge. Alternatively, the controller 14 may update the control parameters after a fixed period of time or in response to zero-crossings in the voltage of the power supply 2.

The lookup tables store values that achieve a particular input or output power at each voltage and speed point. Moreover, the values are chosen such that the efficiency of the motor system 1 at each voltage and speed point is optimized for the particular input or output power. That is to say that various sets of values for the advance period, the conduction period and the freewheel period may result in the same desired input or output power. However, from these various sets of values, a single set is selected that provides the optimal efficiency. Many countries have regulations that impose strict limits on the magnitude of current harmonics that may be drawn from a mains power supply. Accordingly, the values may be chosen such that efficiency is optimized while ensuring that the magnitude of current harmonics drawn from the power supply 2 comply with the required regulations.

Duty-Cycle Compensation

As noted above, each HALL edge represents a change in the polarity of the rotor 5.

Since the rotor 5 induces a back EMF in the phase winding 7, each HALL edge is associated with a respective zero-crossing in the back EMF. Ideally, the duty cycle of the HALL signal is perfectly balanced, which is to say that each HALL pulse spans the same number of mechanical degrees. However, owing to tolerances in the motor system 1, particularly tolerances in the magnetization of the rotor poles, there is generally an imbalance in the duty cycle. The back EMF induced in the phase winding 7, on the other hand, continues to be balanced. Consequently, the angular position of a HALL edge relative to its respective zero-crossing in back EMF may be offset. In particular, the angular position of a HALL edge may lead or lag the zero-crossing. This offset in the angular positions of the HALL edges may adversely affect the behaviour and performance of the motor system 1, as will now be explained.

When operating in steady-state mode, the controller 14 seeks to commutate the phase winding 7 in advance of zero-crossings in the back EMF by an advance period, T_ADV. For the moment, let us assume that the controller 14 operates on the basis that each HALL edge coincides with a zero-crossing in the back EMF. The controller 14 therefore seeks to commutate the phase winding 7 in advance of each HALL edge by the advance period, T_ADV. In order to commutate the phase winding 7 in advance of a particular HALL edge, the controller 14 commutates the phase winding 7 a set period of time, T_COM(n), after the preceding HALL edge, n. The commutation period, T_COM(n), may therefore be defined as:

$$T\_COM(n) = T\_PD(n-1) - T\_ADV$$

where T_PD(n−1) is the HALL period immediately preceding the HALL edge, n, and T_ADV is the advance period.

In the event that each HALL edge coincides with a zero-crossing in the back EMF, the controller 14 will indeed commutate the phase winding 7 in advance of each zero-crossing by the required advance period, T_ADV. If, however, there is an offset in the angular position of a HALL edge relative to the zero-crossing, the controller 14 will instead commutate the phase winding 7 at a period that differs from the required advance period, T_ADV, as will now be demonstrated with reference to FIG. 7.

Figure 7:
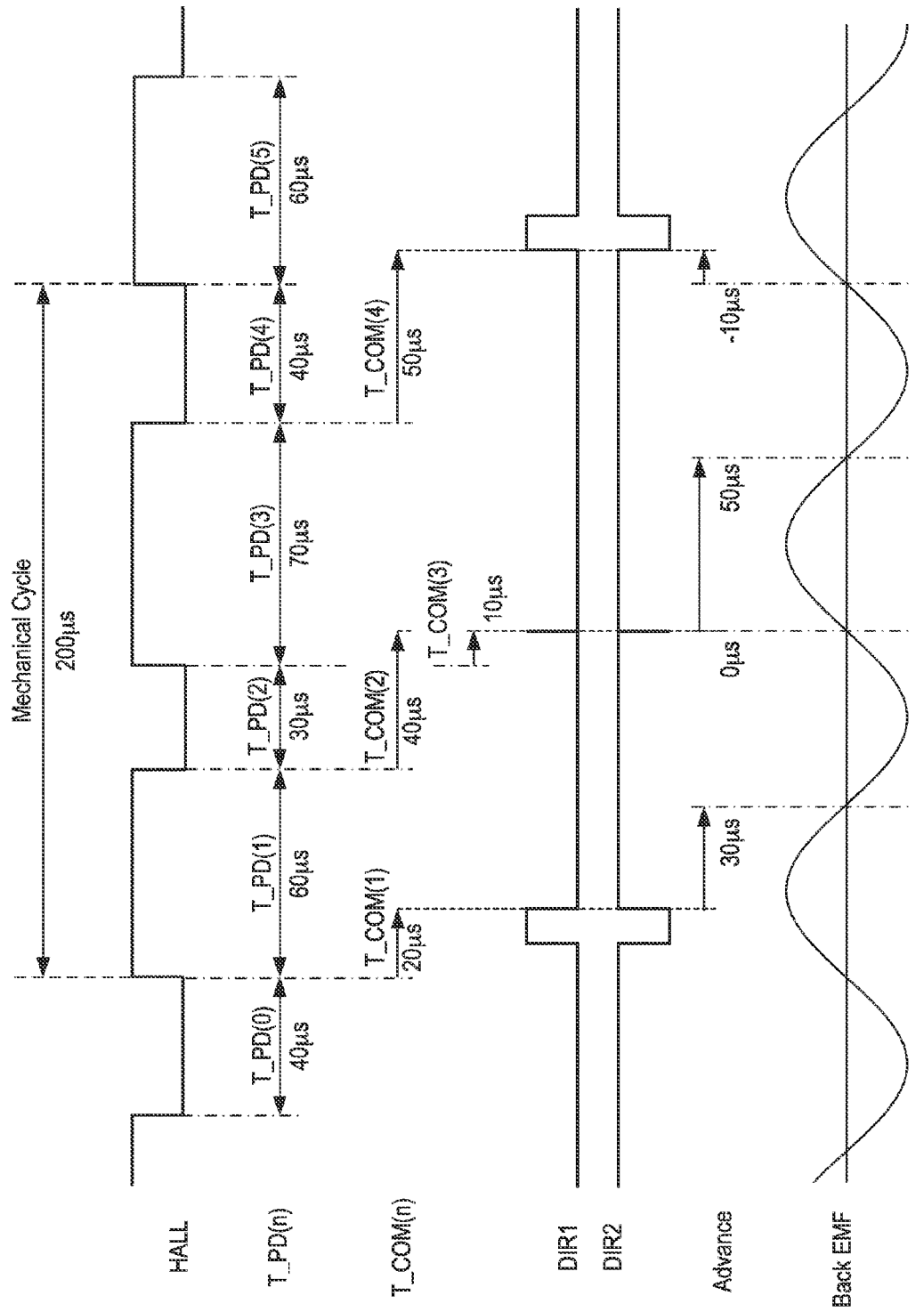
FIG. 7 illustrates various waveforms of the motor system when duty-cycle compensation is not applied.

FIG. 7 illustrates a mechanical cycle of the motor system 1 operating at constant speed. The period of each mechanical cycle is 200 μs. In the absence of any duty-cycle imbalance, the length of each HALL period, T_PD(n), would be 50 μs. However, owing to tolerances in the motor system 1, the first HALL period of each mechanical cycle is 60 μs, the second HALL period is 30 μs, the third HALL period is 70 μs, and the fourth HALL period is 40 μs. The duty-cycle imbalance is therefore 60:30:70:40.

Let us now assume that the controller 14 employs an advance period, T_ADV, of 20 μs and a commutation period, T_COM(n), defined by the equation: T_COM(n)=T_PD(n−1)−T_ADV. In response to a first HALL edge of the mechanical cycle, the controller 14 calculates the commutation period, T_COM(1). Since the HALL period immediately preceding the first HALL edge, T_PD(0), is 40 μs and the advance period, T_ADV, is 20 μs, the commutation period, T_COM(1), is 20 μs. The controller 14 therefore commutates the phase winding 20 μs after the first HALL edge, which corresponds to an advance period of 30 μs relative to the zero-crossing in the back EMF. In response to the second HALL edge of the mechanical cycle, the controller 14 calculates the next commutation period, T_COM(2). Since the preceding HALL period, T_PD(1), is 60 μS and the advance period, T_ADV, is 20 μs, the commutation period, T_COM(2), is 40 μs. The controller 14 therefore commutates the phase winding 40 μs after the second HALL edge. As a result, rather than commutating the phase winding 7 in advance of the next zero-crossing in back EMF, the controller 14 commutates the phase winding in synchrony with the zero-crossing. In response to the third HALL edge of the mechanical cycle, the controller 14 again calculates the commutation period, T_COM(3), which in this instance is 10 μs. The controller 14 therefore commutates the phase winding 10 μs after the third HALL edge, which corresponds to an advance period of 50 μs relative to the next zero-crossing in back EMF. Finally, in response to the fourth HALL edge of the mechanical cycle, the controller 14 calculates the commutation period, T_COM(4), which in this instance is 50 μs. The controller 14 therefore commutates the phase winding 50 μs after the fourth HALL edge. As a result, rather than commutating the phase winding 7 in advance of the next zero-crossing in back EMF, the controller 14 commutates the phase winding 10 μs after the zero-crossing.

In summary, rather than commutating the phase winding 20 μs in advance of each zero-crossing in the back EMF, the controller 14 instead commutates the phase winding 30 μs in advance of the first zero-crossing, in synchrony with the second zero-crossing, 50 μs in advance of the third zero-crossing, and 10 μs after the fourth zero-crossing. Additionally, as can be seen in FIG. 7, the commutation periods T_COM(2) and T_COM(3) are coincident. Consequently, the controller 14 attempts to commutate the phase winding 7 twice in quick succession. As a result, current is driven through the phase winding 7 in the same direction for a relatively long period of time. In the example shown in FIG. 7, the controller 14 drives current through the phase winding 7 from left to right (DIR1) for 10 μs and from right to left (DIR2) for 190 μs of each mechanical cycle. The variance in the advance periods, as well as the clashing of commutation points, adversely affects the performance of the motor system 1. In particular, the output power and/or the efficiency of the motor system 1 may be reduced. Additionally, the magnitude of harmonics within the current waveform drawn from the AC power supply 2 may increase and exceed regulatory thresholds.

The controller 14 therefore employs a duty-cycle compensation scheme for calculating the commutation periods, T_COM(n). First, the controller 14 obtains the average period, T_AVE, between successive HALL edges spanning one or more mechanical cycles:

$$T\_AVE = \sum_{i=1}^{N} T\_PD(i)/N$$

where T_PD(i) is the period between HALL edges i and i+1, and N is the total number of edges per mechanical cycle. The period of a mechanical cycle is unaffected by any imbalance in the duty cycle of the HALL signal. Consequently, by averaging the period between successive edges over one or more mechanical cycles, an average HALL period is obtained that is insensitive to duty-cycle imbalance.

In response to a first HALL edge of a mechanical cycle, the controller 14 calculates a commutation period defined by:

$$T\_COM(1) = T\_AVE - T\_ADV$$

where T_AVE is the average HALL period and T_ADV is the advance period. The controller 14 then commutates the phase winding 7 at a time, T_COM(1), after the first HALL edge.

In response to the second HALL edge of the mechanical cycle, the controller 14 again calculates a commutation period. This time, however, the commutation period is defined as:

$$T\_COM(2) = T\_COM(1) + T\_AVE - T\_PD(1)$$

where T_COM(1) is the commutation period for the first HALL edge, T_AVE is the average HALL period, and T_PD(1) is the period between the first and second HALL edges. The controller 14 then commutates the phase winding 7 at a time, T_COM(2), after the second HALL edge.

In response to the third HALL edge of the mechanical cycle, the controller 14 calculates the commutation period:

$$T\_COM(3) = T\_COM(1) + 2 \times T\_AVE - T\_PD(1) - T\_PD(2)$$

where T_COM(1) is the commutation period for the first HALL edge, T_AVE is the average HALL period, T_PD(1) is the period between the first and second HALL edges, and T_PD(2) is the period between the second and third HALL edges. The controller 14 then commutates the phase winding 7 at a time, T_COM(3), after the third HALL edge.

Finally, in response to the fourth HALL edge of the mechanical cycle, the controller 14 calculates the commutation period:

$$T\_COM(4) = T\_COM(1) + 3 \times T\_AVE - T\_PD(1) - T\_PD(2) - T\_PD(3)$$

where T_COM(1) is the commutation period for the first HALL edge, T_AVE is the average HALL period, T_PD(1) is the period between the first and second HALL edges, T_PD(2) is the period between the second and third HALL edges, and T_PD(3) is the period between the third and fourth HALL edges. The controller 14 then commutates the phase winding 7 at a time, T_COM(4), after the fourth HALL edge.

Figure 8:
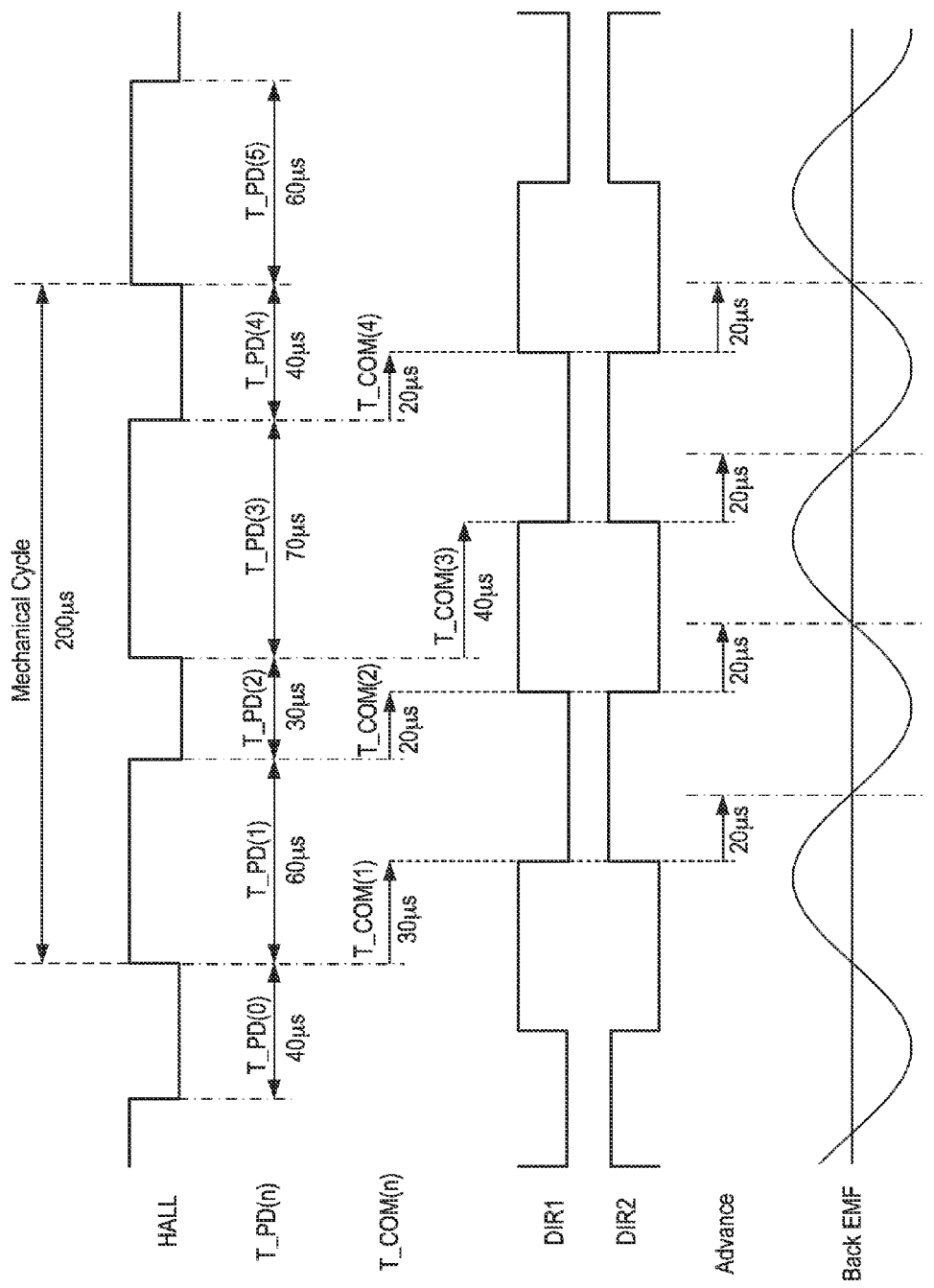
FIG. 8 illustrates various waveforms of the motor system when duty-cycle compensation is applied.

FIG. 8 illustrates a mechanical cycle of the motor system 1 in which the commutation periods are calculated using the above-described compensation scheme. The mechanical period, the duty-cycle imbalance, and the advance period are unchanged from the example shown in FIG. 7. Since the period of the mechanical cycle is 200 μs, and there are four HALL edges per mechanical cycle, the average HALL period, T_AVE, is 50 μs. The commutation period, T_COM(1), for the first HALL edge is therefore 30 μs, which corresponds to an advance period of 20 μs relative to the first zero-crossing in back EMF. The commutation period, T_COM(2), for the second HALL edge is 20 μs, which corresponds to an advance period of 20 μs relative to the second zero-crossing in back EMF. The commutation period, T_COM(3), for the third HALL edge is 40 μs, which corresponds to an advance period of 20 μs relative to the third zero-crossing in back EMF. Finally, the commutation period, T_COM(4), for the fourth HALL edge is 20 μs, which corresponds to an advance period of 20 μs relative to the fourth zero-crossing in back EMF.

The controller 14 therefore commutates the phase winding 7 in advance of each zero-crossing in the back EMF by the advance period, T_ADV. Moreover, there is no clashing of commutation points. In contrast, with the example illustrated in FIG. 7, commutation occurs before, at and after zero-crossings in the back EMF. Additionally, there is clashing of two commutation points. The behaviour of the motor system 1 is therefore more stable when employing the duty-cycle compensation scheme. As a result, the output power and/or the efficiency of the motor system 1 are improved. Additionally, the current waveform drawn from the AC power supply 2 has reduced harmonics.

With the duty-cycle compensation scheme described above, a single timer may be used to measure T_AVE, T_COM and T_PD. For example, in response to the first HALL edge, a timer of the controller 14 may be reset and a compare register loaded with the T_COM(1). When the timer and the compare register correspond, the controller 14 commutates the phase winding 7. The timer is not stopped but instead continues to count until the second HALL edge. In response to the second HALL edge, the value of the timer, which corresponds to T_PD(1), is stored to memory, the timer is reset, and the compare register is loaded with T_COM(2). After one mechanical cycle, the memory of the controller 14 will therefore store T_PD(1), T_PD(2), T_PD(3) and T_PD(4). These periods can then be summed and divided by four to obtain T_AVE.

In the embodiment described above, the controller 14 commutates the phase winding 7 in advance of each zero-crossing in back EMF when operating in steady-state mode. The reason for this is that, as the rotor speed increases, the HALL period decreases and thus the time constant (L/R) associated with the phase inductance becomes increasingly important. By commutating the phase winding 7 in advance of each zero-crossing, the supply voltage is boosted by the back EMF. As a result, the direction of current through the phase winding 7 may be more quickly reversed. Additionally, as the rotor speed increases, so too does the back EMF induced in the phase winding 7, which in turn influences the rate at which phase current rises. By commutating the phase winding 7 in advance of each zero-crossing, the phase current may be caused to lead the back EMF, which then helps to compensate for the slower rise. Although this then generates a short period of negative torque, this is normally more than compensated by the subsequent gain in positive torque. The controller 14 therefore advances commutation when operating in steady-state mode owing to the relatively high rotor speeds that are involved. However, if the motor system 1 were to operate at lower speeds within steady-state mode, it may not be necessary to advance commutation. Moreover, optimum efficiency and/or minimal current harmonics may be achieved by retarding commutation until after each zero-crossing in back EMF. Accordingly, when operating in steady-state mode, the controller 14 may advance, synchronize or retard commutation relative to the zero-crossings in back EMF. Consequently, the commutation period for the first HALL edge may be defined more generally as:

$$T\_COM(1) = T\_AVE + T\_PS$$

where T_PS is a phase-shift period that may be negative (advanced commutation), zero (synchronous commutation) or positive (retarded commutation). The controller 14 may then adjust the phase-shift period, T_PS, in response to changes in the supply voltage and/or the rotor speed.

The controller 14 may correct each commutation period, T_COM(n), for certain variances that are particular to each motor system 1. For example, the controller 14 may correct each commutation period for misalignment of the Hall-effect sensor 13 relative to the rotor 5. Any corrections to the commutation periods need only be applied to the first commutation period, T_COM(1). This is because subsequent commutation periods, T_COM(n), depend on the first commutation period. Consequently, the commutation period for the first HALL edge may be defined more generally as:

$$T\_COM(1) \propto T\_AVE + T\_PS$$

and the commutation periods for subsequent HALL edges may be defined as:

$$T\_COM(n) = T\_COM(1) - (n-1) \times T\_AVE - \sum_{i=1}^{n-1} T\_PD(i)$$

Edge Selection

In the above example of duty-cycle compensation, the rising edge of the 60 μs HALL pulse was treated as the first HALL edge of each mechanical cycle. If the falling edge of the 60 μs HALL pulse were instead treated as the first HALL edge, the controller 14 would commutate the phase winding 10 μs rather than 20 μs in advance of each zero-crossing in the back EMF. This difference in the advance periods arises because there is a different offset in the angular positions of the two HALL edges relative to their respective zero-crossings in the back EMF. The times at which the phase winding 7 is commutated therefore depend on which HALL edge is selected as the first edge of each mechanical cycle. During operation of the motor system 1, the controller 14 will consistently select the same HALL edge as the first edge of each mechanical cycle. However, when the motor system 1 is powered off and on, the controller 14 may select a different HALL edge as the first edge of each mechanical cycle. As a result, the performance of the motor system 1 may vary with each power off and on. In order to ensure that the performance of the motor system 1 is consistent, the controller 14 employs an edge selection scheme that selects a reference edge as the first edge of each mechanical cycle. As explained below, the reference edge is selected such that the angular position of the reference edge relative to its respective zero-crossing in the back EMF is the same with each power on of the motor system 1. As a result, the performance of the motor system 1 is consistent with each power off and on.

The controller 14 first measures the periods, T_PD(n), of four successive HALL pulses. The controller 14 measures the HALL pulses in response to one only of a rising edge and a falling edge of the HALL signal. As a result, the first HALL pulse measured by the controller 14 will consistently have either a rising leading edge or a falling leading edge. The controller 14 then selects the leading edge of the first HALL pulse as the reference edge on the condition that:

$$T\_PD(1) + T\_PD(2) \geq T\_PD(3) + T\_PD(4)$$

Otherwise, the controller 14 selects the leading edge of the third HALL pulse as the reference edge.

The controller 14 therefore compares two operands. The first operand comprises a first period, T_PD(1)+T_PD(2), that spans roughly one half of a mechanical cycle. The second operand comprises a second period, T_PD(3)+T_PD(4), that spans the other half of the mechanical cycle.

If the two operands are equal, this implies that the duty cycle of the HALL signal is balanced over each half of the mechanical cycle, i.e. the first two HALL pulses span 180 mechanical degrees and the second two HALL pulses span 180 mechanical degrees. Consequently, if the leading edge of the first HALL pulse is offset relative to its respective zero-crossing in back EMF then the leading edge of the third HALL pulse will be offset relative to its respective zero-crossing by the same amount. This is true even if the duty cycle of the HALL signal is unbalanced within each mechanical half-cycle. So for example, the duty cycle of the HALL signal, as measured in mechanical degrees, may be 100:80: 110:70. In spite of the imbalance that occurs within each mechanical half-cycle, the difference between the leading edge of the first HALL pulse (i.e. the 100 degree pulse) and the leading edge of the third HALL pulse (i.e. the 110 degree pulse) is 180 mechanical degrees. Consequently, the leading edge of either the first HALL pulse or the third HALL pulse may be selected as the reference edge. In the equation provided above, the controller 14 selects the leading edge of the first HALL pulse in the event that the two operands are equal. However, the controller 14 could equally select the leading edge of the third HALL pulse.

If the first operand is greater than the second operand, the controller 14 selects the leading edge of the first HALL pulse, otherwise the controller 14 selects the leading edge of the third HALL pulse. The controller 14 could equally select the converse, i.e. select the leading edge of the first HALL pulse in the event that the first operand is less than the second operand. Indeed, the operator in the above equation could be any one of ≥, >, ≤ or <, so long as the same operands and operator are employed with each power on. Accordingly, in a more general sense, the controller 14 may be said to compare a first operand and a second operand, and then select the leading edge of the first HALL pulse when the result of the comparison is logically true, and select the leading edge of the third HALL pulse when the result of the comparison is logically false.

Reference has thus far been made to selecting the leading edge of either the first HALL pulse or the third HALL pulse. However, once a unique operand has been identified, the actual edge that is selected by the controller 14 is unimportant, so long as the same selection criterion is applied with each power on. So, for example, the controller 14 might select the trailing edge of either the first HALL pulse or the third HALL pulse.

As a consequence of the edge selection scheme, the controller 14 selects a reference edge for which the angular position of the reference edge relative to its respective zero-crossing in back EMF is the same with each power on. The controller 14 may select a different HALL edge as the reference edge with each power on. Nevertheless, the angular position of the reference edge relative to its respective zero-crossing is the same. So, for example, the duty cycle of the HALL signal, as measured in mechanical degrees, may be 100:80:110:70. With each power on, the controller 14 may measure the HALL pulses in one of two sequences: 100:80: 110:70 and 110:70:100:80. The controller 14 will therefore select the leading edge of either the 100 degree pulse or the 110 degree pulse with each power on. However, the leading edges of the pulses are separated by 180 mechanical degrees and thus, as noted above, the edges will have the same angular position relative to their respective zero-crossings in back EMF.

By selecting a reference edge for which the angular position of the edge relative to its respective zero-crossing in back EMF is the same, and then commutating the phase winding 7 at times relative to the reference edge, the behaviour and performance of the motor system 1 are consistent with each power off and on.

The difference in the lengths of the operands may be relatively small and thus may be influenced by transient effects. In order that transient effects do not result in the wrong HALL edge being selected, each operand may comprise the sum of HALL pulses accumulated over a number of mechanical cycles, i.e. $\Sigma(T\_PD(1)+T\_PD(2))$ $\Sigma(T\_PD(3)+T\_PD(4))$.

During initial acceleration of the motor 3, the speed of the rotor 5 is naturally increasing and thus the length of each HALL pulse decreases. Consequently, edge selection may be delayed until such time as the motor 3 is operating in steady-state mode. However, even when operating in steady-state mode, variations in the speed of the motor 3 may influence which HALL edge is selected as the reference edge. For example, the duty cycle of the HALL signal may be 92:90: 90:88 in mechanical degrees. With each power on, the controller 14 may measure the HALL pulses in one of two sequences: 92:90:90:88 and 90:88:92:90. Irrespective of the sequence measured by the controller 14, the controller 14 should select the leading edge of the 92 degree pulse with each power on. Let us now assume that the speed of the rotor 5 is constant and that the length of each mechanical cycle is 200 µs. The controller 14 will therefore measure the two possible sequences as 51:50:50:49 µs and 50:49:51:50 µs respectively. Accordingly, as expected, the controller 14 consistently selects the leading edge of the 51 µs pulse (i.e. the 92 degree pulse) with each power on. If, on the other hand, the rotor 5 is accelerating, the controller 14 may measure the two sequences as 51:49:48:46 µs and 50:48:49:47 µs respectively. With the first sequence, the controller 14 selects the leading edge of the 51 µs pulse (i.e. the 92 degree pulse), as expected. However, with the second sequence, the controller 14 selects the leading edge of the 50 µs pulse (i.e. the 90 degree pulse). Accordingly, if the reference edge is selected at a time when the rotor speed is changing, a different HALL edge may be selected with each power on. An alternative method of selecting the reference edge will therefore be described that overcomes this problem.

With the scheme described above, the controller 14 compares two operands. The first operand comprises a first period, $T\_PD(1)+T\_PD(2)$, that spans roughly one half of a mechanical cycle. The second operand comprises a second period, $T\_PD(3)+T\_PD(4)$, that spans the other half of the mechanical cycle. The reason why this scheme suffers from changes in rotor speed is that the first period leads the second period. This problem may be addressed by introducing a third period and a fourth period. The first operand then comprises the sum of the first period and the third period, and the second operand comprises the sum of the second period and the fourth period. The third and fourth periods, like the first and second periods, are successive and each span roughly one half of a mechanical cycle. Importantly, however, the third period trails the fourth period. The third period spans the same half of a mechanical cycle as that of the first period. The only difference is that the two periods are measured over different mechanical cycles. The fourth period spans the mechanical half-cycle immediately preceding the third period. As a consequence, the fourth period spans the same half of a mechanical cycle as that of the second period. In contrast to the first and third periods, the second and fourth periods may be measured over the same mechanical cycle (i.e. the second and fourth periods may be one and the same) or different mechanical cycles. So, for example, the controller 14 may select the leading edge of the first HALL pulse as the reference edge on the condition that:

$$T\_PD(1)+T\_PD(2)+T\_PD(5)+T\_PD(6) \geq 2 \times (T\_PD(3)+T\_PD(4))$$

In this example, the third period is $T\_PD(5)+T\_PD(6)$ and the fourth period is $T\_PD(3)+T\_PD(4)$. It will be evident that the second and fourth periods are one and the same. As a further example, the controller 14 may select the leading edge of the first HALL pulse on the condition that:

$$T\_PD(1)+T\_PD(2)+T\_PD(9)+T\_PD(10) \geq T\_PD(3)+T\_PD(4)+T\_PD(7)+T\_PD(8)$$

In this further example, the third period is $T\_PD(9)+T\_PD(10)$ and the fourth period is $T\_PD(7)+T\_PD(8)$.

When the two operands are defined in the manner described above, the two operands are equal only when the duty cycle of the HALL signal is balanced over each half of a mechanical cycle and the speed of the rotor 5 is constant or varying linearly. The controller 14 therefore suspends excitation of the phase winding 7 when measuring the relevant HALL pulses. As a result, the speed of the rotor 5 decreases linearly during the measurement. Alternatively, if it is possible to measure the HALL pulses at a time when the speed of the rotor 5 is constant or varies linearly then the step of suspending phase excitation may be omitted. Since the speed of the rotor 5 is constant or varying linearly when measuring the HALL pulses, the two operands are equal only when the duty cycle of the HALL signal is balanced over each mechanical half-cycle.

Putting this altogether, the edge selection scheme employed by the controller 14 may proceed in the following manner. First, the controller 14 suspends excitation of the phase winding 7. The controller 14 then measures the HALL periods, $T\_PD(n)$, of six successive HALL pulses. As with the original edge selection scheme, the controller 14 measures the HALL pulses in response to one only of a rising edge and a falling edge of the HALL signal. As a result, the first HALL pulse will consistently have either a rising leading edge or a falling leading edge. The controller 14 then selects the leading edge of the first HALL pulse as the reference edge on the condition that:

$$T\_PD(1)+T\_PD(2)+T\_PD(5)+T\_PD(6) \geq 2 \times (T\_PD(3)+T\_PD(4))$$

Again, as with the original scheme, the operator in the above equation could be any one of $\geq$, $>$, $\leq$ or $<$, so long as the same operands and operator are employed with each power on.

Reference has thus far been made to measuring the length of individual HALL pulses. However, the controller 14 could equally measure the periods between rising edges only or falling edges only of the HALL signal. Accordingly, in a more general sense, the HALL signal may be said to have N edges per mechanical cycle. The controller 14 then measures a first period between edges n and n+N/2, and a second period between edges n+N/2 and n+N, where n is any integer. In the original edge selection scheme, the first operand comprises only the first period and the second operand comprises only the second period. In the alternative edge selection scheme, the controller 14 measures a third period between edges n+mN and n+mN+N/2, and a fourth period between edges n+mN−N/2 and n+mN, where m is any integer. The first operand is then the sum of the first period and the third period, and the second operand is the sum of the third period and the fourth period. When m equals 1, the second and fourth periods are one and the same. Consequently, the second and fourth periods are obtained by making a single measurement between edges n+N/2 and n+N. For both edge selection schemes, the controller 14 then compares the first operand and the second operand, selects an edge of the first period in the event that the result of the comparison is logically true, and selects an edge of the second period in the event that the result of the comparison is logically false.

Two different schemes for selecting a reference edge have thus far been described. However, other schemes for selecting a reference edge are possible. For example, over each mechanical cycle, the HALL signal has two pulses that have rising leading edges and two pulses that have falling leading edges. The controller 14 may therefore compare the lengths of the two HALL pulses that have rising leading edges. The controller 14 may then select the rising edge of the longest or shortest HALL pulse as the reference edge. If the two HALL pulses have the same length, the controller 14 may compare the lengths of the two HALL pulses that have falling leading edges. The controller 14 would then select the falling edge of the longest or shortest HALL pulse as the reference edge. If the two HALL pulses have the same length then this implies that the duty cycle of the HALL signal is both balanced and repeats with each mechanical half-cycle, i.e. the two halves of the mechanical cycle are indistinguishable (e.g. 95:85:95:85). In this instance, the controller 14 may select a rising or falling edge of the HALL signal as the reference edge.

It will therefore be appreciated that different schemes exist for selecting the reference edge. It is not therefore the intention that the present invention should be limited to one particular scheme. Instead, the present invention is predicated on the realization that imbalance in the duty cycle of the HALL signal may mean that the performance of the motor system 1 is inconsistent with each power off and on, and that this problem may be solved by selecting a reference edge for which the angular position of the edge relative to a zero-crossing in the back EMF is the same with each power on, and then commutating the phase winding 7 at times relative to the reference edge. Nevertheless, there are advantages in employing a scheme for the which the controller 14 compares two operands, a first operand comprising at least the period between HALL edges that span approximately one half of a mechanical cycle, and a second operand comprising at least the period between HALL edges that span the other half of the mechanical cycle. By comparing these two operands, the reference edge may be selected through the use of a single compare operation. This then has the advantage that the scheme is computationally simple, thus reducing the number of instructions performed by the controller 14.

Irrespective of whether the controller 14 employs duty-cycle compensation, the edge selection scheme offers significant advantages by ensuring that the performance of the motor system 1 is consistent with each power off and on. Accordingly, although duty-cycle compensation has significant benefits, it is not essential for ensuring consistent performance.

Although reference has thus far been made to a motor system 1 having a permanent-magnet motor 3, the duty-cycle compensation scheme and/or the edge selection scheme may be used to control the phase excitation of other types of electrical machines, including reluctance machines, motors and generators. The electrical machine may comprise more than one phase winding. Additionally, for certain types of electrical machines, the direction of current through a phase winding may be unidirectional. Consequently, commutation does not necessarily involve reversing the direction of current through a phase winding.

For a permanent-magnet motor, the controller 14 excites the phase winding 7 at periods relative to zero-crossings in the back EMF of the phase winding 7. For a reluctance motor, the controller 14 typically excites the phase winding 7 at times relative to minimums in the inductance of the phase winding 7. Accordingly, in a more general sense, each edge of the rotor-position signal may be said to be associated with a respective zero-crossing in back EMF or minimum in phase inductance.

The motor 3 of the embodiment described above comprises a four-pole rotor 5. However, the controller 14 may employ the duty-cycle compensation scheme and/or the edge selection scheme to drive an electrical machine having a greater number of rotor poles. When employing the duty-cycle compensation scheme, the commutation periods for the first and subsequent edges of the rotor-position signal continue to be defined by:

$$T\_COM(1) \propto T\_AVE + T\_PS$$

$$T\_COM(n) = T\_COM(1) - (n-1) \times T\_AVE - \sum_{i=1}^{n-1} T\_PD(i)$$

The particular edge selection scheme that is employed will ultimately depend on the number of rotor poles.

The rotor-position sensor 13 employed in the above-described embodiment is a Hall-effect sensor, which provides a cost-effective means for sensing the position of a permanent-magnet rotor. However, alternative means capable of outputting a signal indicative of the position of the rotor 5 might equally be employed. For example, the control system 4 may comprise an optical encoder that outputs a digital signal. Alternatively, the stator 6 may comprise a plurality of phase windings. The back EMF induced in a non-excited phase winding may then be used to determine the position of the rotor 5. For example, a zero-cross detector may be used to covert the back EMF induced in the non-excited phase into a digital signal.

The invention claimed is:
1. A method of controlling an electrical machine, the method comprising:
selecting an edge of a rotor-position signal as a reference edge; and commutating a phase winding of the electrical machine at times relative to the reference edge,
wherein the rotor-position signal has N edges per mechanical cycle, N is at least four, each of the N edges is associated with a respective zero-crossing in back EMF or minimum in inductance of the phase winding, at least one of the N edges has an angular position relative to its respective zero-crossing or minimum that differs from that of the other N edges, and the reference edge is selected from the N edges such that the angular position of the reference edge relative to its respective zero-crossing or minimum is the same with each power on of the electrical machine.

2. A method as claimed in claim 1, wherein selecting the reference edge comprises:
measuring a first period between edges n and n+N/2;
measuring a second period between edges n+N/2 and n+N;
comparing a first operand and a second operand, wherein the first operand comprises the first period and the second operand comprises the second period;
selecting an edge of the first period in the event that the result of the comparison is logically true; and
selecting an edge of the second period in the event that the result of the comparison is logically false.

3. A method as claimed in claim 2, wherein selecting the reference edge comprises measuring a third period between edges n+mN and n+mN+N/2, and measuring a fourth period between edged n+mN−N/2 and n+mN, the first operand comprises the sum of the first period and the third period, and the second operand comprises the sum of the second period and the fourth period.

4. A method as claimed in claim 3, wherein m is 1.

5. A method as claimed in claim 2, wherein selecting an edge comprises selecting one of a leading edge and a trailing edge.

6. A method as claimed in claim 1, wherein the rotor-position signal has N pulses per mechanical cycle, each pulse being defined by two successive edges of the rotor-position signal, and selecting the reference edge comprises:
comparing the lengths of at least two of the N pulses; and
selecting an edge of the pulse having the longest or shortest length.

7. A method as claimed in claim 6, wherein selecting the reference edge comprises:
comparing the lengths of each of the N pulses having one of a rising leading edge and a falling leading edge; and
selecting an edge of the pulse having the longest or shortest length.

8. A method as claimed in claim 7, wherein if two or more of the pulses have the longest or shortest length, selecting the reference edge comprises:
comparing the lengths of each of the other N pulses having the other of a rising leading edge and a falling leading edge; and
selecting an edge of the other pulse having the longest or shortest length.

9. A method of controlling an electrical machine, the method comprising:
selecting an edge of a rotor-position signal as a reference edge; and
commutating a phase winding of the electrical machine at times relative to the reference edge,
wherein the rotor-position signal has N edges per mechanical cycle, N is at least four, and selecting the reference edge comprises:
measuring a first period between edges n and n+N/2;
measuring a second period between edges n+N/2 and n+N;
comparing a first operand and a second operand, wherein the first operand comprises the first period and the second operand comprises the second period;
selecting an edge of the first period in the event that the result of the comparison is logically true; and
selecting an edge of the second period in the event that the result of the comparison is logically false.

10. A method as claimed in claim 9, wherein selecting the reference edge comprises measuring a third period between edges n+mN and n+mN+N/2, and measuring a fourth period between edges n+mN−N/2 and n+mN, the first operand comprises the sum of the first period and the third period, and the second operand comprises the sum of the second period and the fourth period.

11. A method as claimed in claim 10, wherein m is 1.

12. A method as claimed in claim 1 or 9, wherein selecting the reference edge comprises suspending excitation of the phase winding.

13. A control system for an electrical machine, the control system performing a method as claimed in claim 1 or 9.

14. A controller for an electrical machine, the controller having an input for receiving a rotor-position signal and one or more outputs for outputting one or more control signals for commutating a phase winding of the electrical machine, the controller selecting an edge of the rotor-position signal as a reference edge and generating control signals for commutating the phase winding at times relative to the reference edge, wherein the rotor-position signal has N edges per mechanical cycle, N is at least four, each of the N edges is associated with a respective zero-crossing in back EMF or minimum in inductance of the phase winding, at least one of the N edges has an angular position relative to its respective zero-crossing or minimum that differs from that of the other N edges, and the reference edge is selected from the N edges such that the angular position of the reference edge relative to its respective zero-crossing or minimum is the same with each power on.

15. A controller for an electrical machine, the controller having an input for receiving a rotor-position signal and one or more outputs for outputting one or more control signals for commutating a phase winding of the electrical machine, the controller selecting an edge of the rotor-position signal as a reference edge and generating control signals for commutating the phase winding at times relative to the reference edge, wherein the rotor-position signal has N edges per mechanical cycle, N is at least four, and selecting the reference edge comprises: measuring a first period between edges n and n+N/2; measuring a second period between edges n+N/2 and n+N; comparing a first operand and a second operand, wherein the first operand comprises the first period and the second operand comprises the second period; selecting an edge of the first period in the event that the result of the comparison is logically true; and selecting an edge of the second period in the event that the result of the comparison is logically false.

16. A controller as claimed in claim 15, wherein selecting the reference edge comprises measuring a third period between edges n+mN and n+mN+N/2, and measuring a fourth period between edges n+mN−N/2 and n+mN, the first operand comprises the sum of the first period and the third period, and the second operand comprises the sum of the second period and the fourth period.

17. A controller as claimed in claim 16, wherein m is 1.

* * * * *